Patented Mar. 27, 1923.

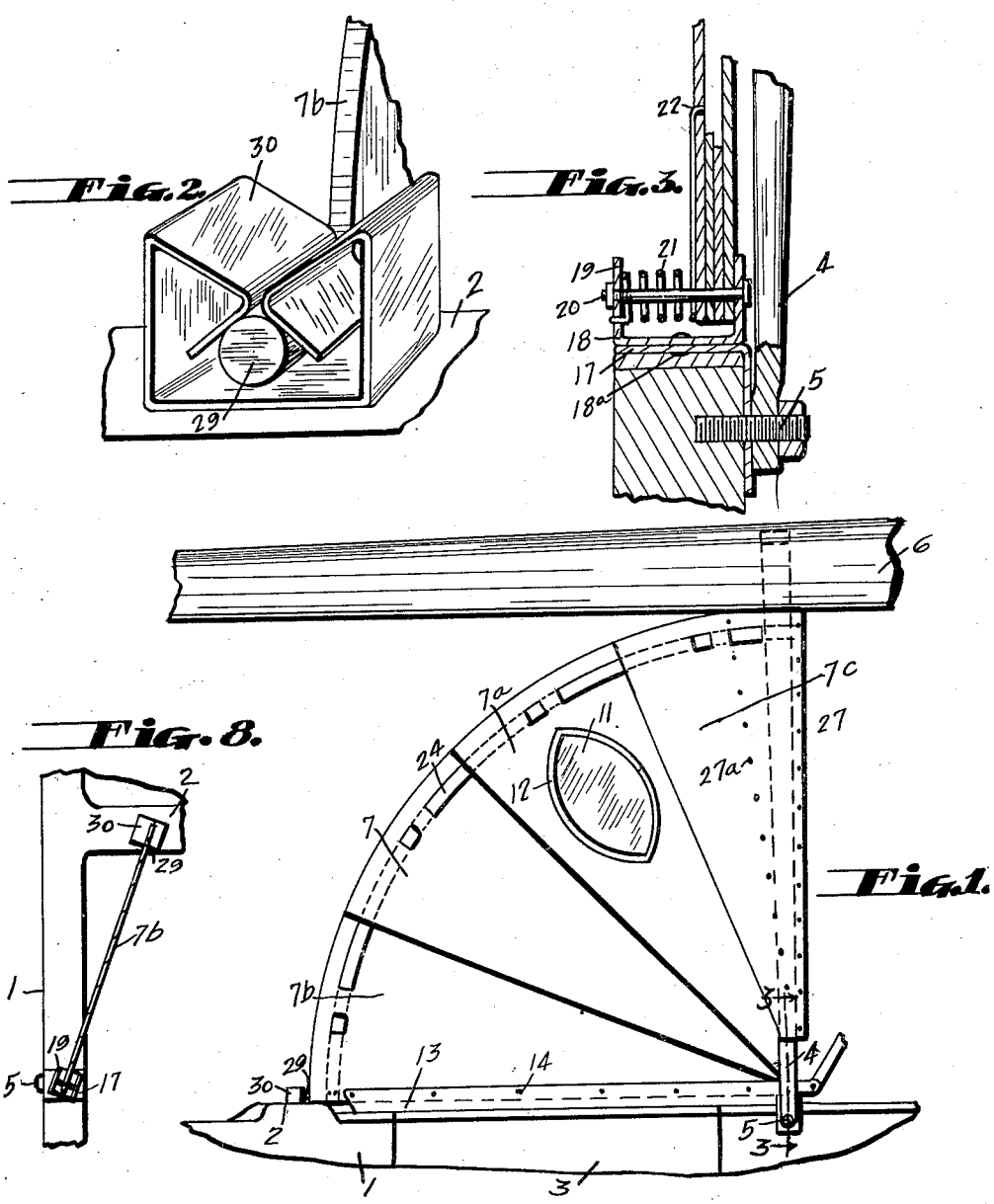

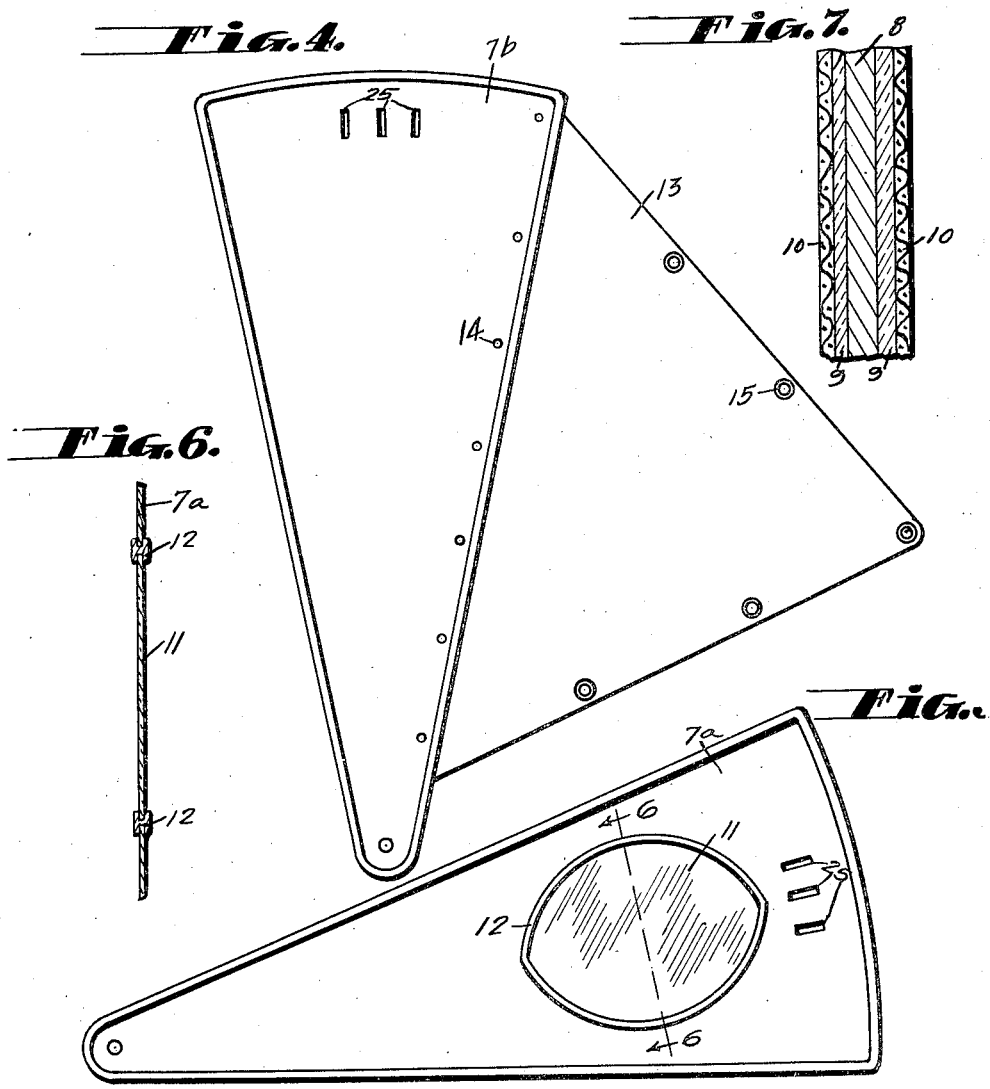

1,450,142

UNITED STATES PATENT OFFICE.

THOMAS DIETRICH, OF ANAHEIM, CALIFORNIA.

WINDSHIELD.

Application filed January 11, 1921. Serial No. 436,509.

*To all whom it may concern:*

Be it known that I, THOMAS DIETRICH, a citizen of the United States, residing at Anaheim, in the county of Orange and State of California, have invented new and useful Improvements in Windshields, of which the following is a specification.

It is the object of this invention to provide a wind shield which may be mounted at the sides of the tonneau of an automobile, and which is also applicable for mounting at the sides of the main wind shield of the automobile.

The improved wind shield contemplates the provision of a fan-like structure which may be either folded into inoperative position or swung downwardly into open position for use at either the side of the tonneau of the automobile or at the side of the main wind shield of the automobile.

The improved wind shield is formed of non-frangible material, so that in the case of accident, the occupants of the automobile will not be injured through breakage of the wind shield.

In the drawings I have illustrated the wind shield supported upon one of the uprights provided at the side of the automobile for the top thereof and in front of the rear seat of the automobile, the wind shield being adapted to be swung downwardly from folded position against said upright, and at the same time inwardly, with its end connected to the back of the front seat of the automobile, so as to form a shield for the tonneau. It will be obvious that the wind shield, as thus constructed, may be as readily secured to the side upright of the main wind shield, so as to be swung downwardly from inoperative position along the side of the automobile body between the wind shield and the front seat.

The invention will be readily understood from the following description of the accompanying drawings, in which:

Figure 1 is a side elevation showing one of the improved wind shields in operative position.

Figure 2 is a perspective view of the clip which engages the swinging end of the wind shield.

Figure 3 is a detail section on the line 3—3 of Figure 1.

Figure 4 is a plan view of the end blade of the fan-like structure forming the wind shield.

Figure 5 is a similar view of the fan blade of the structure which is provided with a window.

Figure 6 is a detail section on the line 6—6 of Figure 5.

Figure 7 is a detail transverse section through one of the fan blades.

Figure 8 is a plan view of a portion of an automobile showing the wind shield in position for use.

In the drawings the improved wind shield is illustrated as employed in connection with a usual automobile construction including side frame 1 of the automobile provided with the extension 2 at the top of the front seat and with the tonneau door 3 in front of the rear seat. An upright 4 extends upwardly from side frame 1 in front of the rear seat in the usual manner, and is secured at its lower end to the side frame by bolt 5. This upright supports the frame of top 6 in the usual manner.

The improved wind shield comprises a plurality of fan blades 7, each of which preferably consists of a metallic base 8 having its sides covered with paper 9, and an outer covering of cloth 10. By this construction it will be noted that the blades comprising the fan-like wind shield are non-breakable, while, at the same time, providing a noiseless and non-rattling construction.

One of the fan blades shown at $7^a$ is preferably provided with a window of suitable transparent material 11 mounted within a frame 12 set in the fan blade in the usual manner. The lowermost fan blade is preferably provided with a depending apron 13 of suitable fabric material and preferably triangular in shape. This apron may be connected to the fan blade by usual button connections 14, and when the wind shield is in operative position, as shown in Figure 1, this apron extends downwardly within the tonneau of the automobile against the side frame of the same. The apron may be buttoned in position by means of suitable button connections 15.

A pivotal support is provided for the inner ends of the fan blades, and, for this purpose, a clip 17 is received over the edge of side frame 1 at the upright 4, and is preferably held in position by mounting the end of said clip between the upright and side frame 1 with the bolt 5 passing through the same. The clip 17 carries a bearing bracket 18 pivoted thereto, as shown at 18ª, and having upturned ends 19 adapted to receive a bolt 20 through the same. The inner ends of the fan blades are journaled upon this bolt, as clearly shown in Figure 3, and a coil spring 21 is received around the bolt beyond the fan blades, with one end thereof extended radially and connected to the lowermost fan blade 7ᵇ, as shown at 22, and the opposite end of the spring connected to the bearing lug of bracket 18. The outer ends of the fan blades are connected by a suitable flexible strip 24 woven through the same, and connected at its respective ends to the uppermost and lowermost fan blades. For this purpose, three slots 25 may be provided in the swinging end of each of the fan blades, and the strip 24 is woven through these slots from one blade to another, as clearly shown in Figure 1.

The uppermost fan blade 7ᶜ is pivotally secured along its rear edge to upright 4, as by extending the cloth covering 10 for the respective sides of the blade around the upright 4 and connecting said side coverings by the button connections 27 or 27ª. The two rows of button connections are provided for adjusting the position of the wind shield with relation to upright 4, so as to bring window 11 into the line of vision.

It will be noted that the construction thus described provides a fan-like structure which will normally be swung upwardly by spring 21, so that the fan blades ovelie one another, and are received against upright 4. When, however, it is desired to move the wind shield, as thus constructed, into position for use, it is only necessary to swing the lowermost fan blade downwardly and at the same time swing the shield transversely until it is received against the top of the front seat of the automobile, and an efficient wind shield will thus be formed.

In order to removably retain the wind shield in operative position, a pin 29 projects radially beyond the lower edge of the lowermost blade 7ᵇ, and is arranged to be received within a spring clip 30 mounted upon the top of the front seat of the automobile, as clearly shown in Figure 8. When the pin is inserted between the spring jaws of the clip, it is positively retained in position thereby, but when exerting sufficient pressure against the pin, it may be readily withdrawn from the spring clip, so that the spring 21 may fold the wind shield in its inoperative position back against upright 4.

Various changes may be made in the construction as thus described without departing from the spirit of the invention.

What is claimed is:

1. A windshield comprising a pivot pin, a plurality of blades pivoted on the pin to occupy folded and extended positions, flexible means for connecting the blades at those ends remote from their pivot, a coil spring associated with one of the blades for urging all of the blades to folded position, and means for retaining all of the blades in extended position against the action of said spring.

2. A windshield comprising a pivot pin, a plurality of fan-shaped blades pivoted on the pin to occupy folded and extended positions, flexible means for connecting the blades at those ends remote from their pivot, a coil spring associated with one of the blades for urging all of the blades to folded position, and a spring clip for retaining all of the blades in extended position against the action of said spring.

3. A windshield comprising a pivot pin, a plurality of fan-shaped blades pivoted on the pin to occcupy folded and extended positions, a bracket for supporting the pin, a coil spring associated with the bracket and with one of the blades for urging all of the blades to folded position, a spring clip adapted to be secured to the side frame of the vehicle, a pin carried by one of the blades and engageable with said clip when the blades are in extended position for securing the latter in such position against the action of said spring, and an apron carried by one of the blades for the purposes described.

In testimony whereof I have signed my name to this specification.

THOMAS DIETRICH.